(12) United States Patent
Dorey et al.

(10) Patent No.: US 7,149,607 B2
(45) Date of Patent: Dec. 12, 2006

(54) DRIVEABILITY RATING METHOD AND SYSTEM

(75) Inventors: Robert Edward Dorey, West Chiltington Pulborough (GB); Beatrice Anne Catherine Gondrë, Steyning (GB)

(73) Assignee: Ricardo UK Limited (GB)

( * ) Notice: Subject to any disclaimer, the term of this patent is extended or adjusted under 35 U.S.C. 154(b) by 239 days.

(21) Appl. No.: 10/474,048

(22) PCT Filed: Apr. 3, 2002

(86) PCT No.: PCT/GB02/01542

§ 371 (c)(1),
(2), (4) Date: Jun. 23, 2004

(87) PCT Pub. No.: WO02/081253

PCT Pub. Date: Oct. 17, 2002

(65) Prior Publication Data

US 2004/0236473 A1    Nov. 25, 2004

(30) Foreign Application Priority Data

Apr. 6, 2001 (GB) ................... 0108766.7

(51) Int. Cl.
G06F 7/00 (2006.01)
G01D 3/02 (2006.01)

(52) U.S. Cl. .................. 701/1; 701/29; 702/108; 702/109

(58) Field of Classification Search ............ 701/1, 701/29, 32, 35; 340/438, 439; 700/32; 702/182–189, 702/108–109
See application file for complete search history.

(56) References Cited

U.S. PATENT DOCUMENTS 5,416,703 A    5/1995   Gruler et al.
5,448,442 A    9/1995   Farag
5,499,182 A *  3/1996   Ousborne ............. 701/35
6,079,258 A    6/2000   List et al.
6,317,666 B1  11/2001   List et al.
6,598,467 B1   7/2003   Schoggl et al.
6,894,606 B1 * 5/2005   Forbes et al. ........ 340/435

FOREIGN PATENT DOCUMENTS

| EP | 1 085 312 A2 | 3/2001 |
| EP | 1085312 A2   | 3/2001 |
| EP | 0846945 B1   | 6/2002 |
| JP | 1-19049      | 8/1989 |
| JP | 1-190947     | 8/1989 |
| JP | 1-190948     | 8/1989 |
| JP | 1-190949     | 8/1989 |

(Continued)

OTHER PUBLICATIONS

Nobuo Iwai, et al.; "Development of Drivability Analyser System" (7 pages), no date.

(Continued)

Primary Examiner—Y. Beaulieu
(74) Attorney, Agent, or Firm—Osha Liang LLP

(57) ABSTRACT

The system carries out continuous in-vehicle data measurement and storage for subsequent processing. A given driving manoeuvre is sub-divided into facets and the measured vehicle data is processed to provide a local rating for each of the facets using empirically derived transfer functions. The local ratings are weighted and combined to provide an overall rating which is converted to a rating out of ten based on a further transfer function based on correlations between derived and subjectively observed ratings. As a result, driveability rating and engine calibration/development can be accelerated and targeted.

12 Claims, 15 Drawing Sheets

FOREIGN PATENT DOCUMENTS

JP    1-19047    8/1999
JP    1-19048    8/1999

OTHER PUBLICATIONS

Instruction Pamplet for the DM-100 (15 pages), no date.
Innovative Testing Procedure and Facilities for Engine Development in True Road-Like Conditions (14 pages), no date.
G. S-Rooke, etc al.; "Computer Modelling of a Vehicle Powertrain for Driveability Development" (11 pages), no date.
Document D881051 (and database extract) corresponding closely to Non-Patent Literature Document entitled "Development of Driveability Analyser System", Nobuo Iwai, et al. (prior art previously cited on Feb. 25, 2005 as Cite No. CA in English).

* cited by examiner

DRIVEABILITY RATING METHOD AND SYSTEM

The invention relates to a driveability rating method and system.

Currently, driveability ratings for vehicles are determined subjectively by experienced drivers. A vehicle is driven through a series of predetermined manoeuvres and, based on the performance of the vehicle, as determined by the driver, a rating between 1 (very bad) and 10 (excellent) is provided for each manoeuvre. A non-exhaustive list of manoeuvres includes start time, start quality, pull-away (accelerating from stationary), 'tip-in' or acceleration and 'tip-out' or deceleration. Manoeuvres are assessed across more than one range—for example tip-in may be examined for city traffic (less than 40 miles per hour/64 kilometres per hour), highway conditions (more than 40 miles per hour/64 kilometres per hour) or high revs per minute (more than 3000 RPM). In addition vehicle performance can be rated for different ambient conditions, for example at very low or very high temperatures, or at high altitude.

Driveability quality is a consequence of the engine or more generally speaking the powertrain characteristics which either do or do not allow the driver to enjoy driving his vehicle. Driveability can be adjusted by calibration of the powertrain (engine and gear box electronic control systems) but derives as well from intrinsic qualities of the hardware (driveline, engine supports, etc.)

Driveability should not be confused with drive and handling characteristics, which derive from the body and suspensions qualities, or with NVH (Noise, Vibration and Harshness) which represents another field of refinement, more linked to vehicle parameters. However, some levels of vibration and noise can sometimes be improved by engine management system calibration and are then mentioned during driveability assessments: they can concern for instance idle stability and noise of diesel engines in cold conditions, etc.

Because subjective means is typically used to rate driveability, it is likely to lead to the following problems: different points of view possible about what is acceptable and what is not; impossible to objectively compare the assessments of different drivers since only their ratings and comments are left after the tests; in the same way, it is difficult for one driver to compare the behaviour of several different vehicles, especially when there is a long time interval between two assessments; difficulties in explaining and describing what a problem is or what the expected behaviour is, linked to wording and vocabulary difficulties, leading in the worst case to misunderstandings; and trouble for the calibrators to compare results at different stages of the calibration and to objectively assess and quantify the progress.

For example, for many of the manoeuvres the experienced driver is attempting to sense various associated phenomenon which may affect the rating provided for the manoeuvre. With start quality the driver looks for conditions such as 'overshoot' in which the engine speed runs too high above the idle speed and then settles down to it or "undershoot" which can occur with the engine, upon return to idle, whereby the engine speed drops below the idle speed and then returns to it. In acceleration-type manoeuvres the driver may look for one of a range of conditions including 'thump' for which there is an initial surge upon throttle actuation, 'shuffle' in which there is an unacceptable acceleration oscillation during the manoeuvre or 'hesitation' where, once the throttle position is stabilised, there is a perceived hole in the acceleration, that is, a drop in the rate of acceleration.

It will be apparent that the level of subjectivity of driveability rating can give rise to problems in consistency of rating between drivers. Apart from simple driver variation, where a number of factors are taken into consideration in providing a rating for a given manoeuvre, the level of subjectivity may be further increased because of the individual driver's perception and assessment of the significance of the individual factors. For example, in a tip-in with high thump but minimal shuffle, a first driver may be more concerned with the latter factor and provide a high rating whilst another driver may find the level of thump unacceptable and provide a low rating.

A known automated rating method is set out in U.S. Pat. No. 6,079,258. The object of this arrangement is to develop algorithms from real driving assessments to allow driveability ratings to be derived from vehicle measurements and to be applied on the test bed. In a first step a driver takes a vehicle on the road and various parameters of vehicle operation such as engine speed and longitudinal acceleration are continuously measured. In addition predefined 'trigger conditions' are set such that, off-line, appropriate parts of the recorded data can be evaluated defined by the trigger condition. In the evaluation stage a Fast Fourier Transform is applied to the longitudinal acceleration data to identify the peak amplitude of surge oscillation in a frequency range corresponding to the transient operational phase of the engine. The values thus derived are related to the driveability rating provided by the driver using an empirically derived formula having one or more constants derived by an iterative process. The formula thus derived can then be applied on the test bed. In this case the longitudinal acceleration is derived from the engine speed on the test bed using a further self-learning process.

This arrangement suffers from various problems. It is dependent upon a number of approximations. Because of the manner in which these approximations are derived, there is no compensation for anomalous effects which might occur outside the specific range for which this system is calibrated. Yet further the system relies on a highly simplistic analysis of the vehicle measured values.

A further problem of existing driveability tools is that they do not give useful detail concerning how the rating was derived nor what should be improved practically to achieve satisfactory driveability in further developments. As a result they produce results based on a black box system rather than providing an active tool to help the calibrator/customer in their work; for example existing systems do not allow physical targets to be set up for a calibration project after comparing competitive vehicles in a benchmarking exercise.

According to the invention there is provided a method of assigning a driveability rating to a predetermined manoeuvre in a vehicle comprising the steps of:

identifying a plurality of manoeuvre facets;

recording vehicle performance data for the manoeuvre;

deriving a local rating for each manoeuvre facet from the vehicle performance data; and combining the local ratings to provide an overall driveability rating for the manoeuvre, in which the local rating is derived using a predetermined transfer function. As a result an accurate and efficient rating method is provided allowing a rating breakdown to be easily provided by accessing the local ratings. Yet further, the use of transfer functions allows accurate and repeatable derivation of each local rating.

Preferably the transfer function is derived empirically, as a result of which the method will apply beyond the range of vehicle conditions for which the function was formulated.

A vehicle driver driving style factor may be derived from the recorded vehicle data and the local rating is derived taking the driver driving style factor in account. As a result, the ratings are normalised across all drivers.

The gear ratio for the manoeuvre may be recorded, a related gear ratio factor identified and the local rating derived taking the gear ratio factor into account. Accordingly the manoeuvre does not have to be repeated in separate gears as this factor is normalised.

The local ratings may be weighted prior to their combination to form an overall driveability rating.

The combined local ratings may be subjected to an overall transfer function to provide the overall driveability rating for the manoeuvre.

The local rating may be derived from a predefined valid portion of the vehicle performance data, such that only relevant parts of the data require analysis. Preferably the predefined valid portion of the vehicle performance data is processed to provide representative data prior to derivation of the local rating, and preferably the processing step includes a linearisation step.

The invention further relates to a vehicle development method comprising the steps of assigning a driveability rating for a manoeuvre as set out above comparing the assigned rating with a target value and, if the target value is not met, identifying the respective local ratings for each facet of the manoeuvre, identifying those local ratings not meeting respective target sub-values and identifying related vehicle performance factors requiring development providing rapid and targeted vehicle calibration and development.

According to the invention there is further provided a driveability rating system for a vehicle in which, for a predetermined manoeuvre having a plurality of manoeuvre facets, vehicle performance data for the manoeuvre is recorded in a data store or processor, a local rating is derived by a data processor for each facet from the vehicle performance data; and the local ratings are combined in the processor to provide an overall driveability rating for the manoeuvre in which the local ratings are derived using respective predetermined transfer functions.

According to the invention there is yet further provided a method of assigning a driveability rating to a predetermined manoeuvre in a vehicle comprising the steps of:
  deriving a rating function for a predetermined rating value;
  identifying an error or proportional value between the derived function and a measured function; and
  deriving a rating based on the error or proportional value.

A simple and accurate rating system is therefore provided. Because the tool gives objective ratings for manoeuvres, based on physical metrics extracted from the data, this enables it to overcome problems with the known systems. The main criteria subjectively used by the drivers to assess driveability are summarised and given metrics by the tool for each type of manoeuvre. This increases the driver's ability to better understand what makes good or bad driveability. The tool can be used during benchmarking exercises to objectively compare different vehicle qualities, and to benchmark competitors vehicles. If such an exercise takes place at the beginning of a calibration project, the tool can be used to set objective targets for driveability development. For example, the tool can be used to set values for the metrics of manoeuvres at levels that capture the customer targets for the calibration work. The tool can then produce ratings from these values. During a calibration project, the ratings given by the tool reflect and quantify the progress toward the set targets. The tool can be used by developers to quantify improvements in vehicle driveability; determine the direction of the calibration effort; trade-off conflicting calibration requirements, and demonstrate the achievement at key project milestones. Accordingly, the communication amongst the calibrators and between the calibration team and the customer is made easier.

Embodiments of the invention will now be described, by way of example, with reference to the drawings in which.

Figure 24:
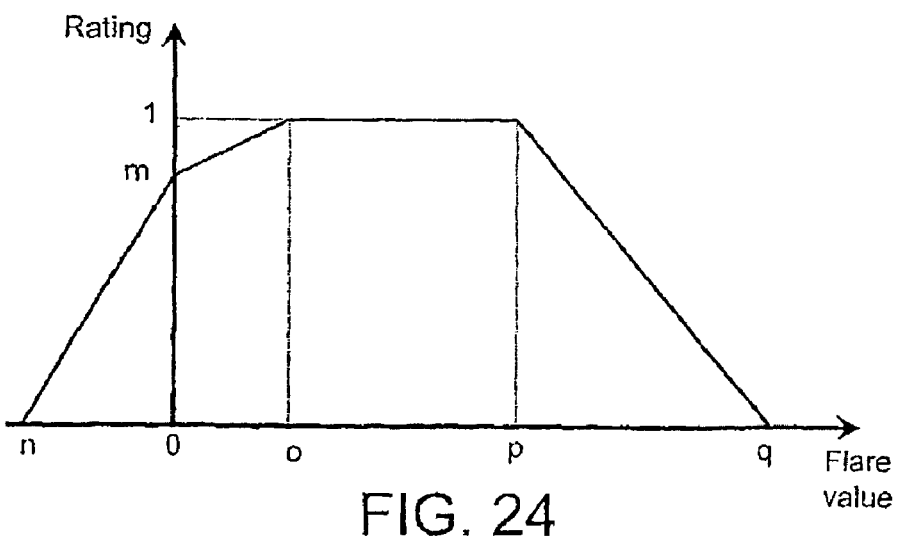
Figure 25:
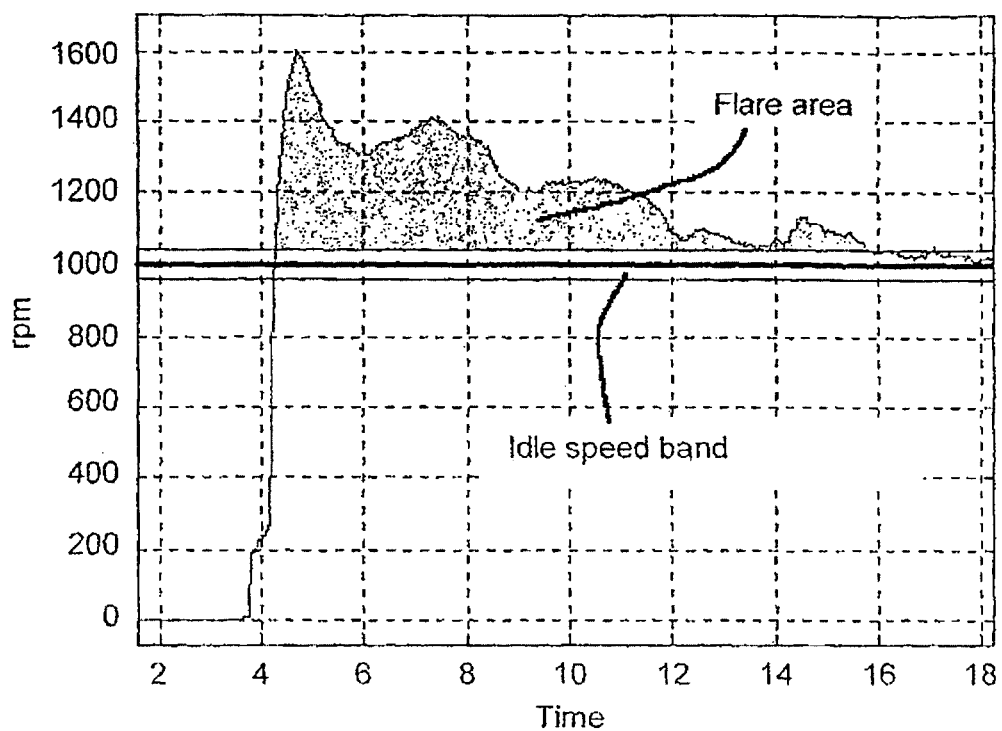

FIG. 24 provides a transfer function for the engine start-up flare value aspect;

FIG. 25 is a plot of engine speed against time in engine start-up mode; and

Figure 26:
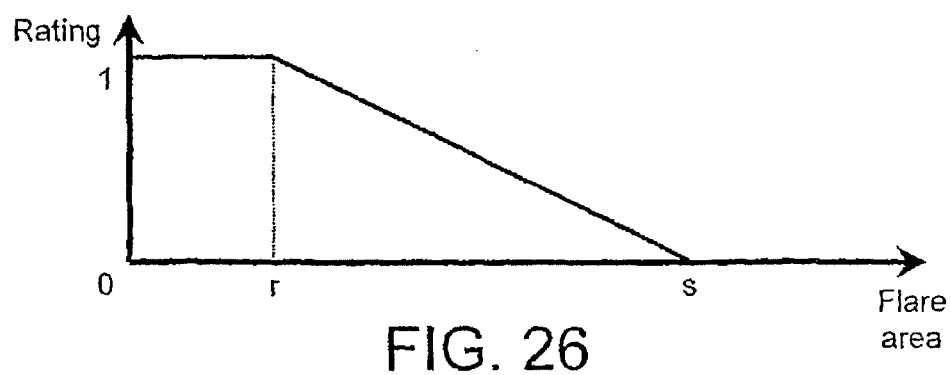

FIG. 26 is a transfer function for the flare area aspect.

Figure 1:
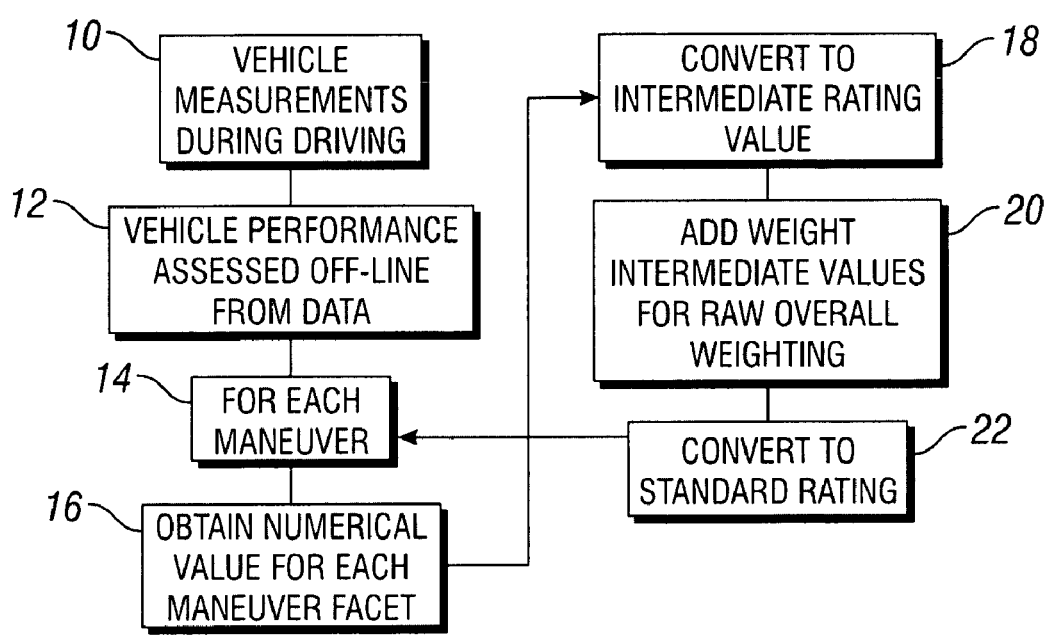
FIG. 1 is a flow diagram showing the manner of assigning the driveability rating according to the present invention.

The method and system of the present invention is discussed in overview with reference to FIG. 1 in relation to a typical situation in which a vehicle or engine in the development stages is being tested against a vehicle class benchmark as part of the development process. In such arrangements, the developers will want to assess whether driveability aspects are meeting the benchmark and if not, redesign or recalibration may be required. Such redesign or recalibration may be in relation to the engine hardware itself or the engine management system, but in either case the developers require detailed and targeted data allowing them quickly to identify specific aspects of the engine or engine control that require modification and indeed even an indication of the type of modification required.

At step 10, the driver takes the vehicle through a full range of predetermined manoeuvres and vehicle measurements are continuously taken during driving. These are stored in appropriate data storage means for subsequent off-line data processing (although it will be recognised that this can be on-line as well). The data processing takes place at step 12 in which the vehicle performance for various aspects or facets of the required manoeuvres is assessed from the data.

At step 14, a first manoeuvre to be rated is identified and the vehicle performance data relating to each pre-defined facet of that manoeuvre is processed to obtain a raw numerical value for that facet at step 16. Each numerical value is converted, using a transfer function to a local or intermediate rating value at step 18. At step 20 the local ratings for each facet of the manoeuvre are weighted and combined to provide a raw overall rating. At step 22 the raw overall rating is converted to a standard rating out of 10 using a further transfer function. This is then repeated for each manoeuvre.

The transfer functions used and aspects of measured vehicle parameters processed are empirically determined based on observations of correlations between measured data and driver-perception of various manoeuvres and manoeuvre facets. As a result the system requires front end design rather than significant on-line or off-line data processing. In addition, the system is reliable beyond the parameter range for which the transfer functions are compiled as it does not rely purely on identifying mathematical relationships between measured values.

A detailed discussion will now be provided to explain how the tool is set up and used. The manoeuvres can be performed on any appropriate manual/automatic vehicle.

In the first stage (to set up the tool), the driver takes the vehicle through the predetermined driveability manoeuvres and at the same time a range of signals are recorded including: engine speed; vehicle speed; gear number (measured directly or deduced from engine in vehicle speed); accelerator/throttle pedal position; clutch pedal position; longitudinal acceleration; battery voltage; normal idle speed; engine coolant temperature. It will be recognised that additional values can be taken. The frequency and accuracy of data taken is dependent on the resolution of the processing requirements subsequently and data storage capacity. In this phase benchmark vehicles are used against which a development vehicle is to be evaluated, and the driver rates the benchmark vehicles for each manoeuvre performed. Significantly, in this phase, not only the numerical driver rating is recorded but also the driver's specific comments and criticisms. Based on these, as discussed below, transfer functions and ranges of data can be determined allowing an accurate correlation of measured vehicle data and manoeuvre rating/manoeuvre facet rating. This phase, during which the settings of the transfer functions are determined is preferably carried out using as many drivers and as many benchmark vehicles as possible in order that experience of anomalous or additional parameter variations is gained to improve the compilation of the transfer functions and the process as a whole.

The aim is to match each potential problem/quality with one or several features of some selected recorded signals, and to extract characteristic values from the signals which can be linked to the driver comments. This is where the comments are more important than the ratings. As one problem on a manoeuvre is enough to obtain a low mark, it is not always possible to match the quality of another specific aspect of the manoeuvre with the rating. For instance a tip in can be perfect in terms of shuffles but very slow. The rating will be poor and it will not reflect the absence of shuffles. If the driver's comments have been systematically written down it is easier to check the presence/absence of a given fault for the manoeuvre.

Once significant values have been extracted from the signals for each defined feature, they must be compared with "ideal values" representing a perfect manoeuvre quality, which is achieved by using the transfer function.

For each feature of the manoeuvre, a "local" rating is given, showing how close each aspect of the driveability of the car is to the ideal behaviour. This local rating usually ranges between 0 and 1 (in some cases it can be negative in order to stress a particular bad feature): it is equal to 1 when the quality of the manoeuvre is perfect for the specific feature, to 0 (or less) if the quality is very poor.

As the driver's rating is a subjective combination of several results that the car achieved for a given manoeuvre, in the same way the tool has to combine the local ratings to obtain an overall one. As some faults are more badly rated than other ones, each local rating is given a weight, to calculate the global mark.

It will be appreciated that some aspects of the performance of the car will still be dependent upon individual driver characteristics. A clear example of this is one in which the driver manipulates the accelerator pedal, as aggressive pedal manipulation will provide different readings to a more passive driving style. To filter out this aspect of subjectivity an additional factor termed 'sportivity' is defined, calculated from the data stored for the manoeuvres and incorporated into the subsequent processing steps to normalise this aspect.

The second stage (in which the tool is used) is described in the following with reference to the specific manoeuvres in a development vehicle: tip-in, tip-out and starts.

Tip-ins

All of the manoeuvres discussed can be defined by a limited number of criteria linked to subjective vehicle behaviour and expressible in a physical way using metrics, automatically extracted from the recorded vehicle data by the system. Referring to FIGS. 2 to 10, for example, tip-in quality can be fully assessed considering only the following facets: delay between the beginning of the pedal movement and the acceleration signal rise start, acceleration average rise value, acceleration decrease value once the pedal is stabilised and total oscillations of the acceleration signal.

The first of these facets, the acceleration delay feature, partly characterises the responsiveness of the vehicle to a tip in. The ideal value is zero delay between the beginning of the pedal movement and the beginning of acceleration signal rise. This ideal value is independent of the driver's input. If the delay is too long the driver's comments can be "hesitation" or "unresponsive".

Figure 2:
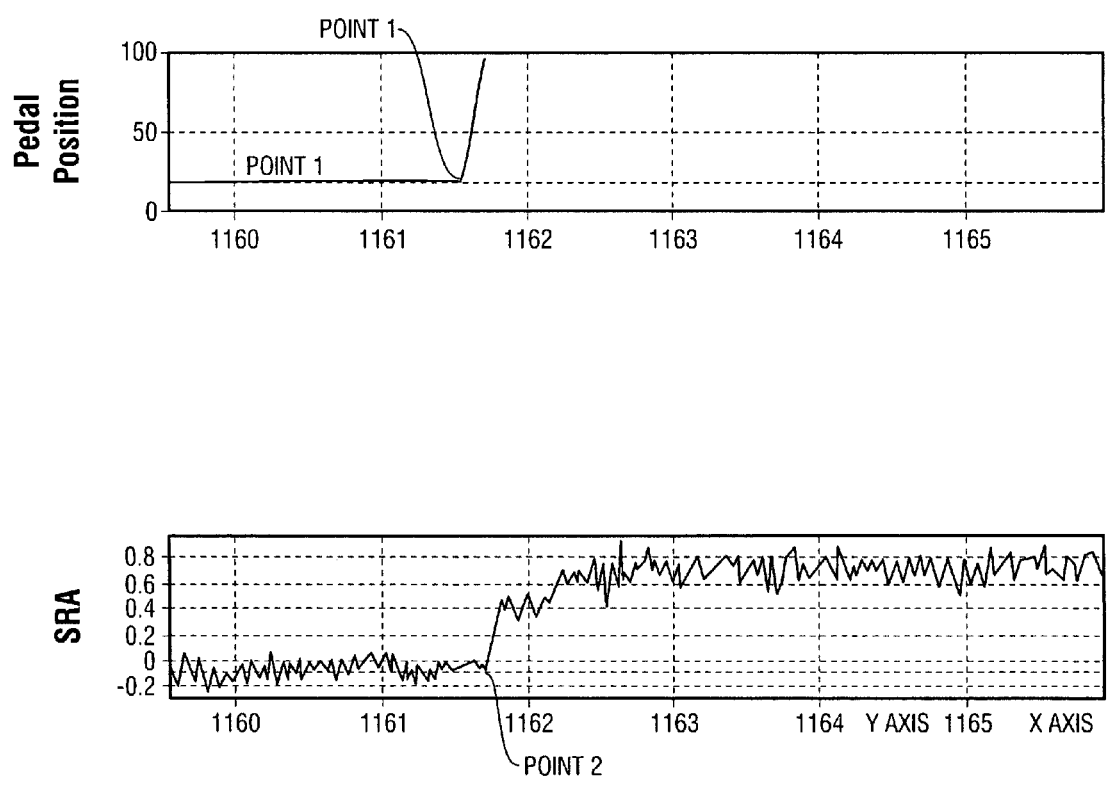
FIG. 2 shows pedal position (upper plot) and seat rail acceleration (SRA—lower plot) against a common time axis for an acceleration delay facet.

In this example the measured value of the delay between points 1 and 2 in FIG. 2 represents the acceleration delay;

$$X_{point2} - X_{point1} = 1161.71 - 1161.54 = 0.17 s \qquad (1)$$

The above calculation is the manual way of finding the acceleration delay. To integrate this calculation into a preferred system, it is necessary to determine the average levels of pedal position and acceleration. Point 1 and Point 2 are then positioned where both signals have risen by a certain amount from their initial average values.

Figure 7:
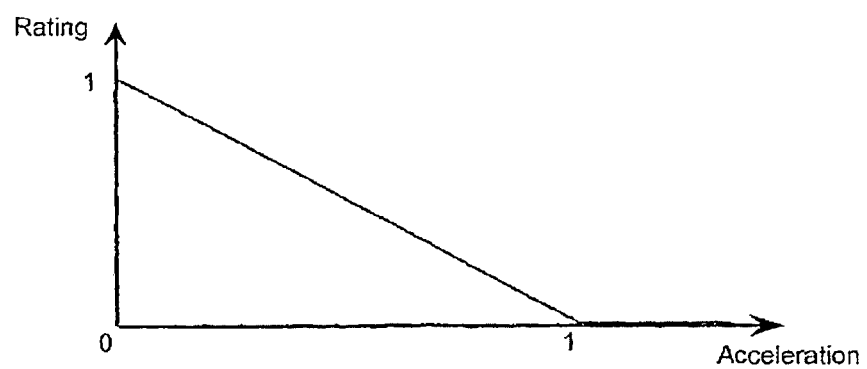
FIG. 7 shows a transport function for the acceleration delay facet.

As a result a numerical value is obtained for this specific facet of the manoeuvre, corresponding to step 16 shown in FIG. 1. This is now converted to an intermediate or local rating value using a transfer function as shown in FIG. 7. The transfer function represents a local rating according to equation (2):

$$\text{rating} = \max(1 - \text{delay}, 0) \qquad (2)$$

This function is a mathematical representation of providing a perfect rating of 1 corresponding to zero delay decreasing linearly to a zero rating, representing very poor, if the delay is equal to or greater than one second.

The next facet of the tip-in manoeuvre is acceleration average rise value. The expected behaviour of the car in this facet is closely linked to the driver's input, that is to say the amplitude and the rapidity of his pedal movement, which are contained in the "sportivity" which is derived and filtered out as discussed below.

The acceleration average rise value is determined between the moments when the accel signal starts to rise and when it stops rising, after the pedal is stabilised. At that stage even if the signal goes on slightly rising or decreases, its value will not be taken into account for the calculation. The average value is used and not an instant value in order to get rid of potential very high slopes due to shuffles.

The slope of the accel signal during or immediately following the tip in is actually more physically perceived by the driver than the absolute value of the acceleration once the pedal is stable. As for a tip in it is more the transient management which is assessed rather than the engine torque value at the final pedal position; the way the engine reaches this final torque is important for the performance feel. This means that the quicker the torque variation the better, which is mathematically expressed by the acceleration signal slope.

The acceleration signal is approximated with a series of straight lines. The slope of the line following the increase in the accelerated pedal signal is taken on the average acceleration rise value. The next step selects the lines which have to be included in the calculation.

Figure 3:
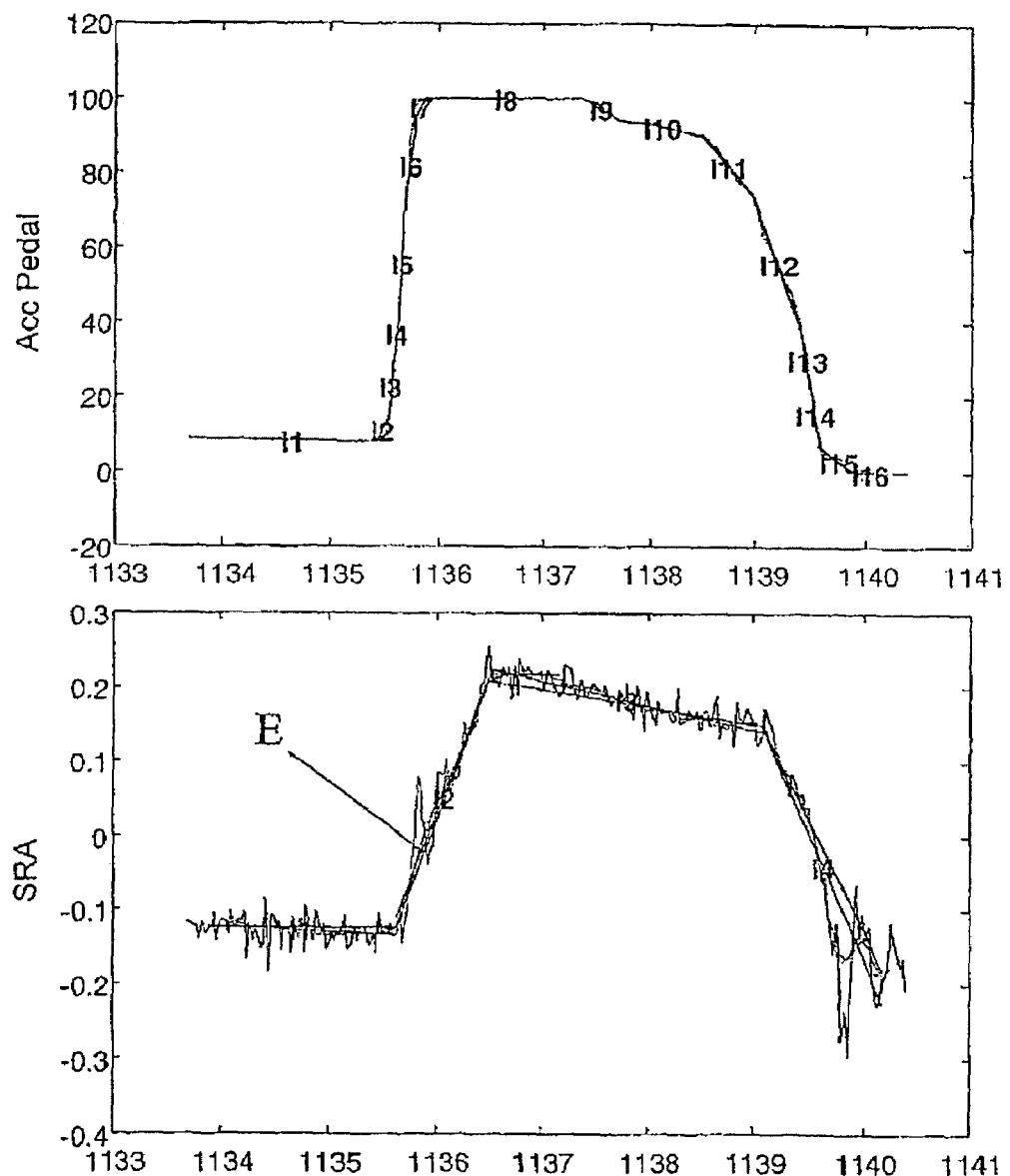
FIG. 3 shows the accelerator pedal position (upper plot) and SRA (lower plot) against a common time axis for an acceleration average rise value facet.

FIG. 3 shows the trace of accelerator pedal position in the upper plot and seat rail, i.e. linear acceleration in the lower plot, each against a synchronised time value. The portion of the acceleration signal relevant to the calculation is shown by region E and the slope of this is calculated to give an average acceleration rise value. The trace shown represents the simplest case in which linearisation provides a single straight line portion in the relevant region. In more complex cases, linearisation may give more than one straight line portion effectively representing a situation where the rate of acceleration changes during the relevant portion. In such cases, in a preferred embodiment, the slope of the straight line between the first point of the first portion and the last point of the last portion is calculated to provide the acceleration average rise value. It will be noted that the acceleration signal shown is noisy—this noise can be filtered out using any appropriate noise filtering technique and lower frequency variations can further be filtered out using appropriate thresholding techniques As discussed above, once significant values have been extracted from the signals for each defined feature for example acceleration average rise value, they must be compared with "ideal values" representing a perfect manoeuvre quality. For some criteria, this ideal value is simple and constant. Taking the example discussed above of the delay between the driver's movement of the accelerator pedal in a tip in and the vehicle's response, the ideal value for this metric is 0 seconds as represented in FIG. 7. For other criteria, the ideal value is more complex to define and a transfer function is required. These functions are empirical and often include calibratable parameters depending on the specific feature under consideration.

The input of these functions may depend on external conditions such as engine coolant temperature, or may depend on the level of the driver's input. An instance of this is the slope of the acceleration signal, one of the tip in criteria, which is a function of the driver's input. If the driver applies a small variation of accelerator pedal position in a very smooth way, the expected response of the vehicle in terms of acceleration rise will be much lower than if the driver applied a sharp and large increase in accelerator pedal position.

Therefore a variable called "sportivity", a function of the driver accelerator pedal input, is factored in. The higher this variable, the more sporty the driver. The value for the driver's sportivity is calculated for each manoeuvre from existing vehicle performance data if needed.

Sportivity is defined as a function of the amplitude of pedal movement and its rate of change of position, i.e. acceleration.

$$s = \Delta + acc \qquad (3)$$

Where:

s = sportivity

Δ = total pedal position variation during the tip in (% of the wide open throttle position)

acc = pedal acceleration $$acc = \frac{\Delta}{t^2} \qquad (4)$$

Where:

t = time between the beginning and the end of the pedal movement $$\text{so } s = \Delta + \frac{\Delta}{t^2} = \Delta \times \left(1 + \frac{1}{t^2}\right) \qquad (5)$$

Where s is in the range 0 to 10,000 and has no physical unit.

Sportivity is one input of the function defining the "ideal value", i.e. the driver's expectations in terms of acceleration average rise value. Another input is also the gear ratio: for instance the driver does not expect the car to respond as quickly to a wide open throttle in fifth gear as in first gear. In order to deal with only one input, sportivity, a single function is defined for all the gear ratios. This function gives the relation between ideal accel rise value divided by gear ratio and sportivity.

This function is empirically defined as follows:

$$F = \frac{\text{ideal\_value}}{\text{gear\_ratio}} \quad (6a)$$

$$= \text{Max}\left(b - \frac{1}{\left(\frac{s}{10000}\right) + c}, a\right) \quad (6b)$$

a, b and c are calibratable parameters which are derived empirically to match functions (6a) and 6(b). They allow a single function independent of the gear used.

The gear ratios used are not the number of each gear but represent the proportionality between each ratio:

$$\text{gear\_ratio} = \frac{\frac{\text{engine\_speed (rpm)} \times 10}{\text{vehicle\_speed (km/h)}}}{\frac{\text{engine\_speed\_gear1} \times 10}{\text{vehicle\_speed\_gear1}}} \quad (7)$$

As a consequence the ratio for gear 1 is unity and the remaining are derived for a given vehicle based on its known ratios.

After determining the measured average acceleration rise value and the ideal one, they are compared to find to which extent the car fulfilled the expectations of the driver in terms of acceleration rise.

If the measured value is equal to or greater than the ideal one, this feature of the signal is assessed as perfect and rated with a 1.

Figure 8:
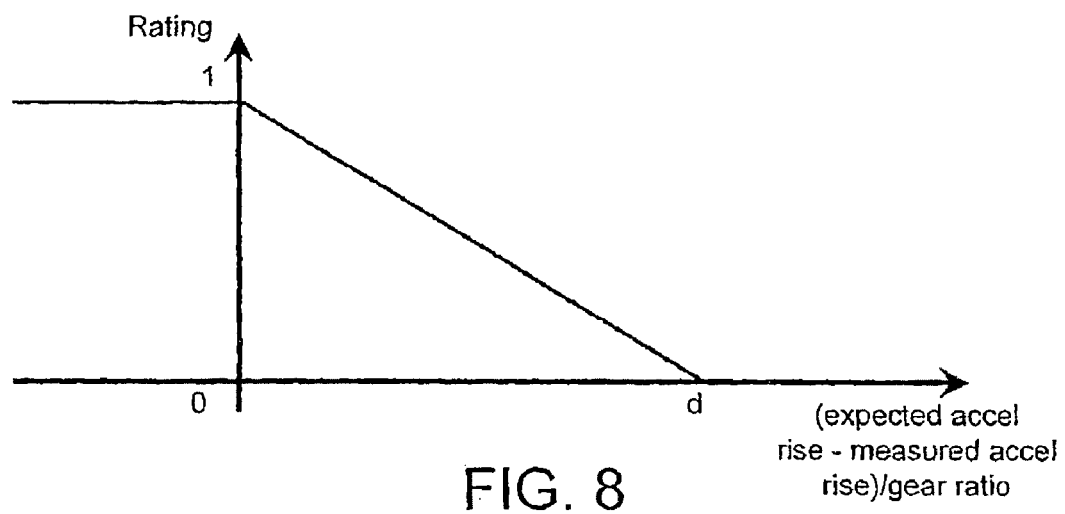
FIG. 8 shows a transport function for the acceleration rise facet.

If the measured value is lower than the ideal one, the rating decreases in proportion to the difference between the two values. It reaches 0 when the difference is equal to or greater than a calibratable parameter. This is represented by Equation (8) and the transfer function is shown at FIG. 8:

$$\text{Rating} = \max\left[\min\left(1 - \left(\frac{\frac{\text{ideal\_value} - \text{measured\_value}}{\text{gear\_ratio}}}{d}\right), 1\right), 0\right] \quad (8)$$

where d is calibratable and derived empirically for a given vehicle and may for example be 1.

The input of this function is the difference between the ideal acceleration rise divided by the gear ratio and the measured acceleration rise divided by the gear ratio. The fact that the gear ratio appears in the input enables a single value "d" to be used for all the tip ins, whichever gear the manoeuvre is performed in.

Having obtained a further intermediate rating value or local rating for the acceleration average rise value, the step is repeated for the acceleration decrease value. Theoretically, this value should always be equal to zero. It represents the negative variations of the acceleration signal after its main rise, once the pedal position is stabilised.

This value is measured between the end of the rising part of the acceleration signal and any new input from the driver: accelerator or brake pedal movement for instance. Sometimes the driver slightly releases the accelerator pedal just after the tip in because he realises that he moved the pedal too far. The starting point of the analysis is then delayed until the pedal is stable and the consequences of its movement on the accel signal are over. The acceleration signal is linearised in the same way as for the acceleration rise analysis discussed with reference to FIG. 3 and the slopes of each straight line portion are calculated. The value left is the lowest one obtained in the analysis window. No average value is calculated since the window is usually quite large (several seconds) whereas a very brief acceleration drop is enough to create a bad impression on the driver. His impression is affected by sharp and short duration changes in acceleration and this is what the analysis attempts to capture. An average value would "dilute" the result and would not express the driver's feeling.

Figure 4:
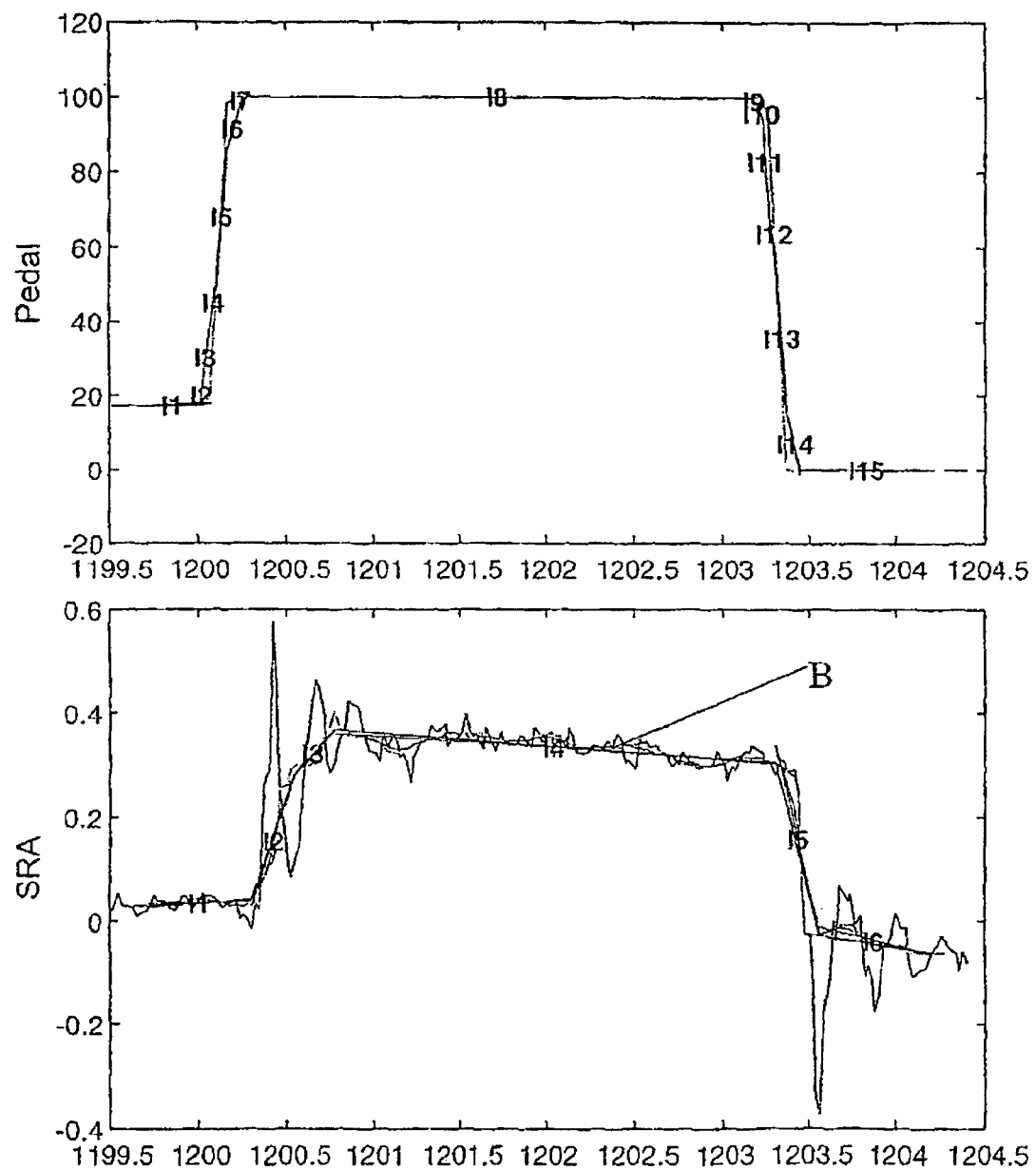
FIG. 4 shows pedal position (upper plot) and SRA (lower plot) against time for an acceleration decrease facet.
Figure 5:
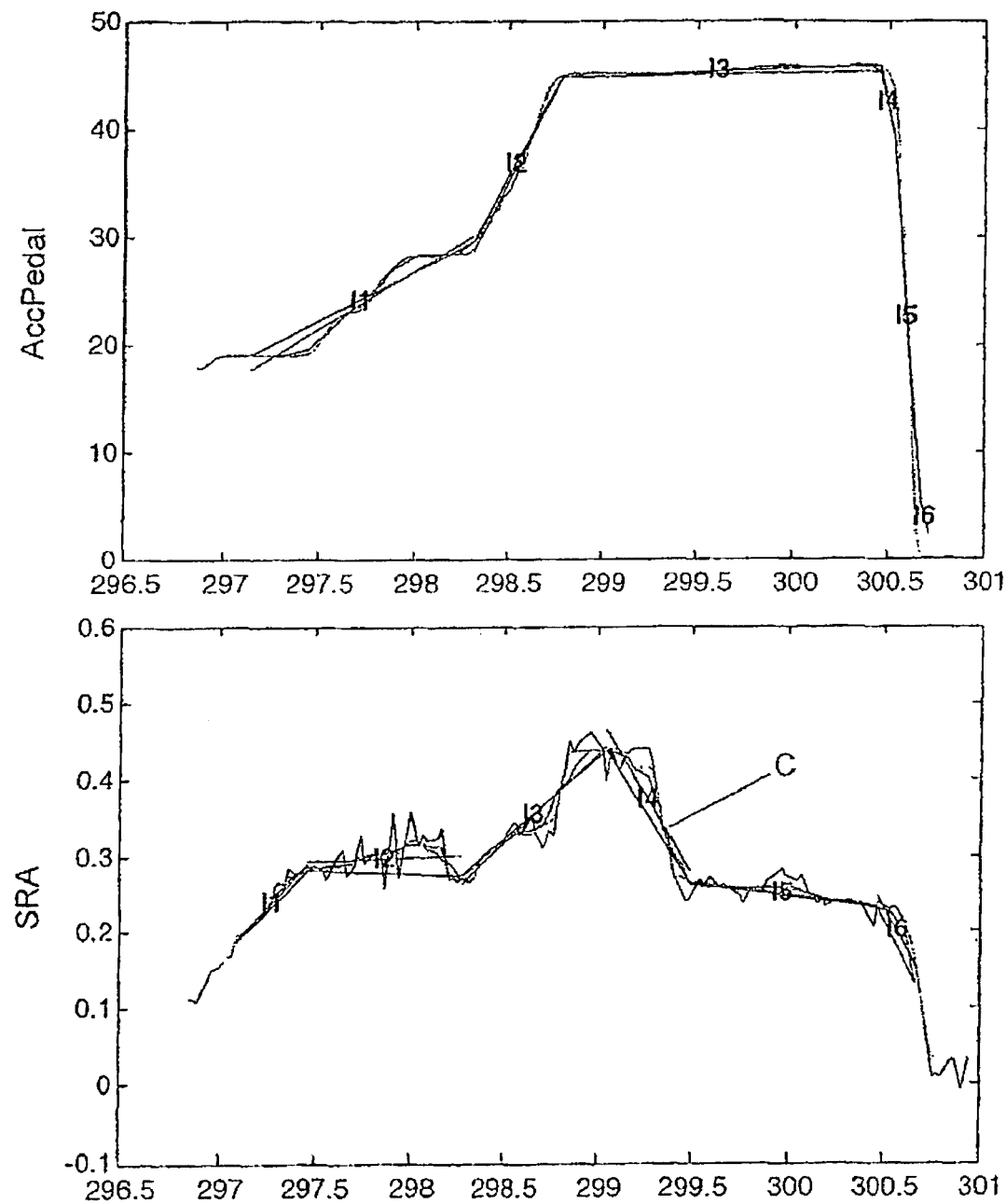
FIG. 5 shows accelerator pedal position (upper plot) and SRA (lower plot) against time for another example of the acceleration decrease facet.

FIG. 4 represents traces of accelerator pedal position (upper trace) and longitudinal acceleration (lower trace) in one possible scenario. In this case, the region for which the acceleration decrease value is measured is designated B. Its slope is simply measured, after appropriate filtering, to derive an acceleration decrease value. In the embodiment shown in FIG. 5 a significant acceleration decrease is shown in the region designated C although it can be seen that the accelerator pedal position at that time is constant. A higher value for the acceleration decrease value will therefore be measured.

Figure 9:
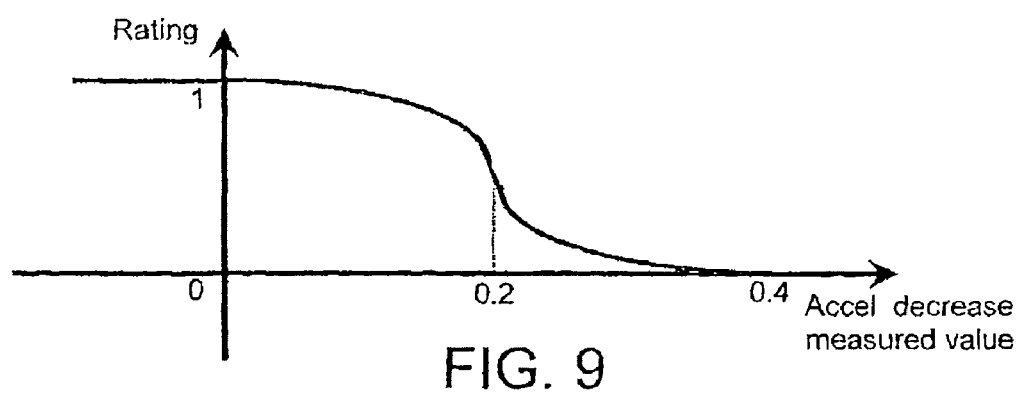
FIG. 9 shows a transport function for the acceleration decrease facet.

Once the measured accel decrease value is determined, it is possible to compare it with the ideal value, which is 0, and give a rating for this particular feature of the signal. The function used to calculate the rating is shown in FIG. 9 as discussed below.

If the acceleration decrease is equal to zero or negative (the acceleration signal actually rises), this is the right behaviour and as a consequence the rating is 1. Physically the drivers accept, or cannot feel, a slight decrease of the acceleration, but as soon as they can perceive it, their rating falls sharply as shown in FIG. 9 as this behaviour is considered unacceptable. The shape of the rating function reflects this fact, with an "acceptance band" after which the rating is close to 0.

The transfer function is represented by the following equation:

$$\text{Rating} = \frac{1}{2} \times (1 - \tanh[10 \times (\min(\max(\text{measure}, 0), e) - f)]) \quad (9)$$

Again e, f are derived empirically in the calibration phase.

The final facet of the tip-in manoeuvre for which a local rating is obtained is the total oscillation of the acceleration signal. This is an important feature of the acceleration signal which characterises a very common transient problem: thump and shuffles. When this problem occurred during the tests, the driver's comments may be "thump", "harsh", "shunt", "bump", "oscillations", "shuffly" or "surgy".

These unwanted excursions of the acceleration signal usually take place during the "accel rise" part of the tip-in. In very bad driveability cases, they can persist during the "stable" part. They are quantified adding up all the vertical movements of the accel signal, provided that they are greater than a threshold.

Figure 6:
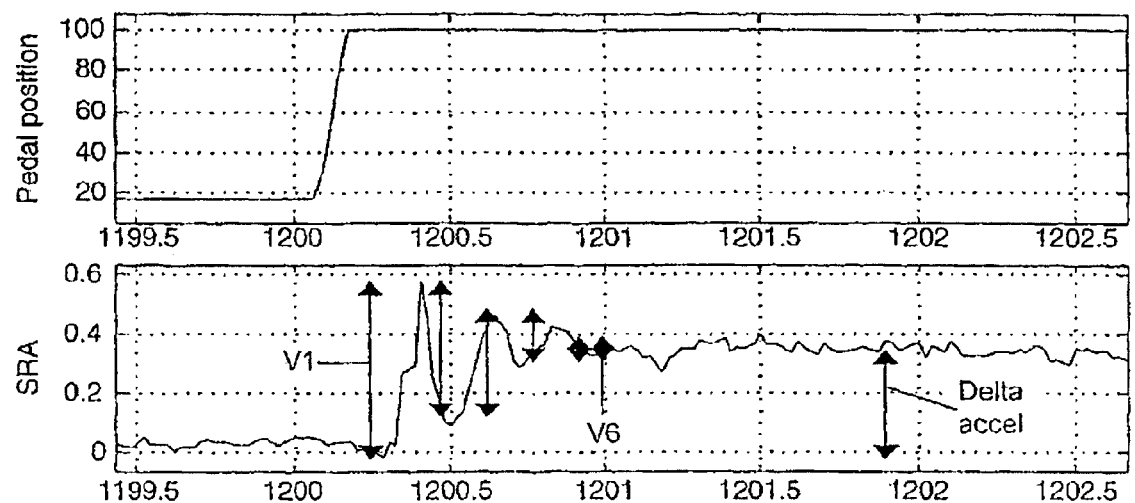
FIG. 6 shows pedal position (upper plot) and SRA (lower plot) against time for a total acceleration oscillation facet.

As shown in FIG. 6 a number of vertical movements V1 to V6 are identified again using appropriate thresholding techniques. These are summed to give a value of overall distance moved (in one direction).

Figure 10:
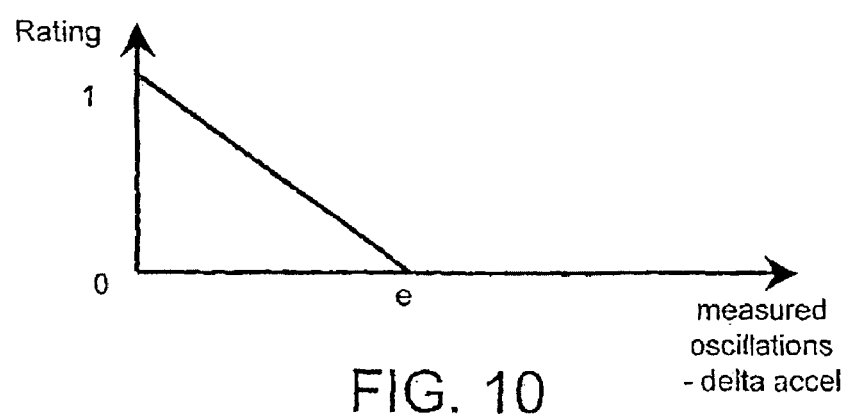
FIG. 10 shows a transport function for an acceleration oscillation facet.

If the acceleration signal was perfectly smooth, the previous calculation would lead to a value equal to the variation of mean acceleration before and after the tip in: "delta accel" on the figure. Therefore delta accel is the ideal value the total oscillation calculation has to be compared with so as to evaluate the corresponding rating. The rating is 1 if the measured value of the accel signal oscillations is equal to delta accel. It decreases proportionally with the difference between the two and reaches 0 when this difference is equal or greater than a calibratable value. This is represented by FIG. 10 and Equation (10).

$$\text{Rating} = \max\left[1 - \frac{\max(\text{measure} - \text{delta\_accel}, 0)}{e}, 0\right] \quad (10)$$

Where e is derived empirically in the calibration phase and can be, for example, 2.

The measured "total oscillations" value includes in the same variable thumps (i.e. initial surge) as well as oscillations (i.e. continuing variation) even though the calibrations to change to correct those two problems can be different. But physically, in terms of the driver's feelings, both phenomena are very similar.

A thump without shuffles would lead to a lower calculated value than a tip in provoking thump plus shuffles. As a result the rating would be higher in the first case than in the second one. In practise drivers too rate tip ins more severely if they are shuffly than if they include a thump only, as a result the empirically derived rating is representative.

As a result it can be seen that, for the tip-in manoeuvre-or perhaps one version of a manoeuvre between a specific range of RPM or at a specific speed, a number of manoeuvre facets have been identified and intermediate rating values or local ratings have been calculated for each of those facets. The calculations have been based on identifying representative portions of the data recorded for the vehicle during the manoeuvre, filtering or otherwise manipulating the data to remove noise as well as known driver-induced anomalies and normalising in respect of driver specific perturbations such as 'sportivity'. The values thus derived are compared against an ideal value and provide a local rating between zero and one using an empirically derived transfer function. In some cases the transfer function has a linear relationship but in others alternative functions are derived to take into account non-linear effects such as, for example, driver tolerance of acceleration decrease after stabilisation of the accelerator pedal.

Once all the individual ratings are calculated for a given manoeuvre, it is possible to obtain the overall rating for it. This is the sum of all the individual weighted ratings. The same weights are applied for all the manoeuvres of the same type, i.e. all the tip-in ratings for instance are calculated using the same weights. Their sum is equal to the number of studied features for the type of manoeuvre assuming that the local rating has a value up to 1. These weights are empirical and result from the drivers' comments and ratings analysis: if a poor aspect of a manoeuvre is considered less acceptable than another one, then the weight for this feature must be relatively high.

Figure 11:
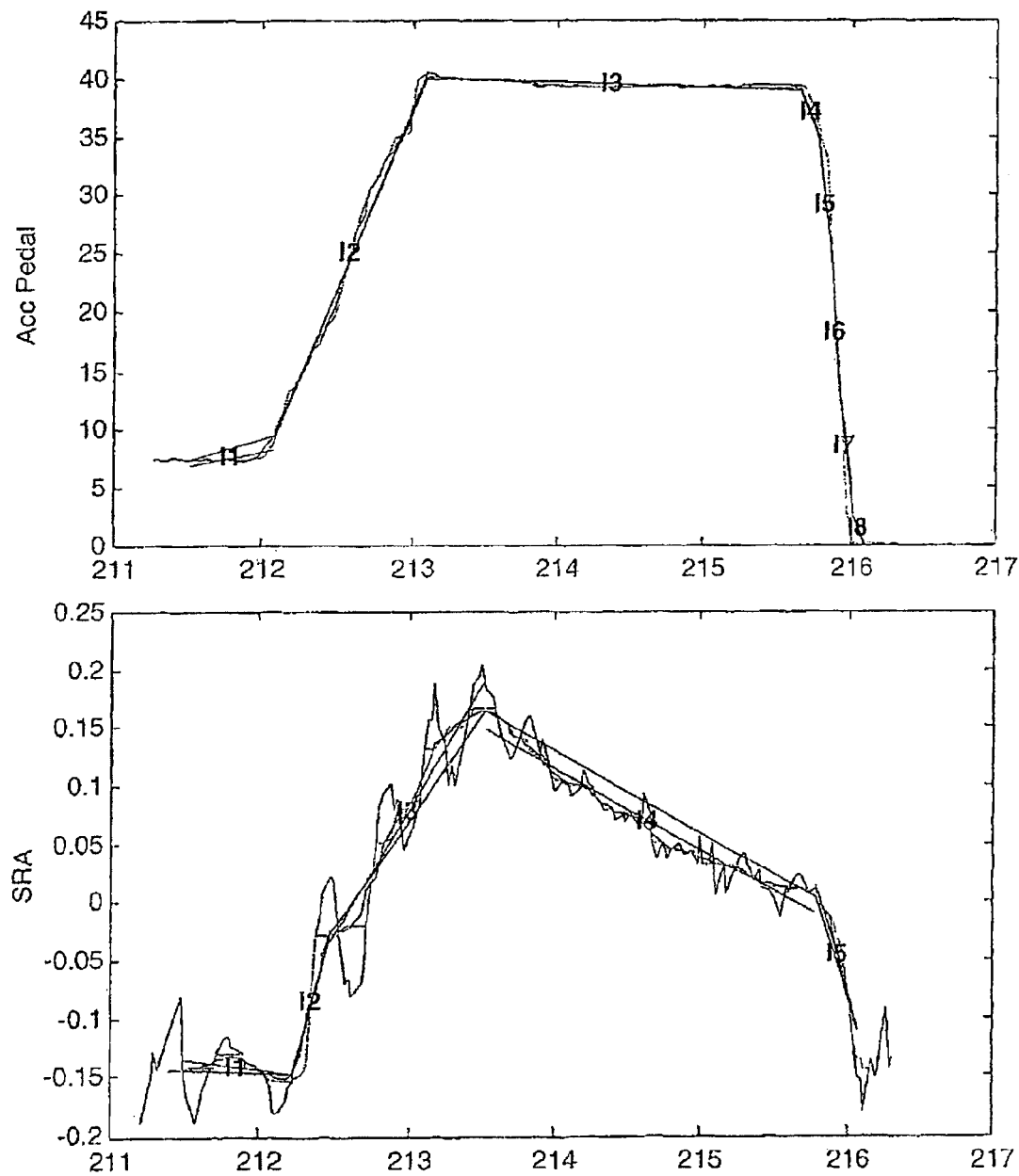
FIG. 11 shows acceleration pedal position (upper plot) and SRA (lower plot) for a vehicle manoeuvre for derivation of various local ratings.

An example of a global rating calculation is now discussed with reference to the trace shown in FIG. 11. The relevant manoeuvre is a 50% tip-in, first gear, to 25 miles per hour (40 kilometres per hour). Table 2 shows, across the top, the various facets of the manoeuvre for which ratings are derived and any delay, average acceleration rise, average deceleration decrease and total oscillations. Along the side are shown the measurements of initial value, the ideal value, the local rating derived between zero and one ('the marks') and the weighting attached to each of the local ratings.

TABLE 2

|  | Delay(s) | Average accel rise (g/s) | Average accel decrease (g/s) | Total oscillations (g) |
| --- | --- | --- | --- | --- |
| Measurement | 0.14 | 0.26 | 0.07 | 0.96 |
| Ideal value | 0 | 0.31 | 0 | 0.34 |
| Mark (0 to 1) | 0.86 | 0.91 | 1 | 0.62 |
| Weight | 0.5 | 1 | 1.25 | 1.25 |

The average rating is obtained from equation 11.

$$\text{Average rating} = \Sigma \text{Mark} \times \text{Weight} \quad (11)$$

Figure 12:
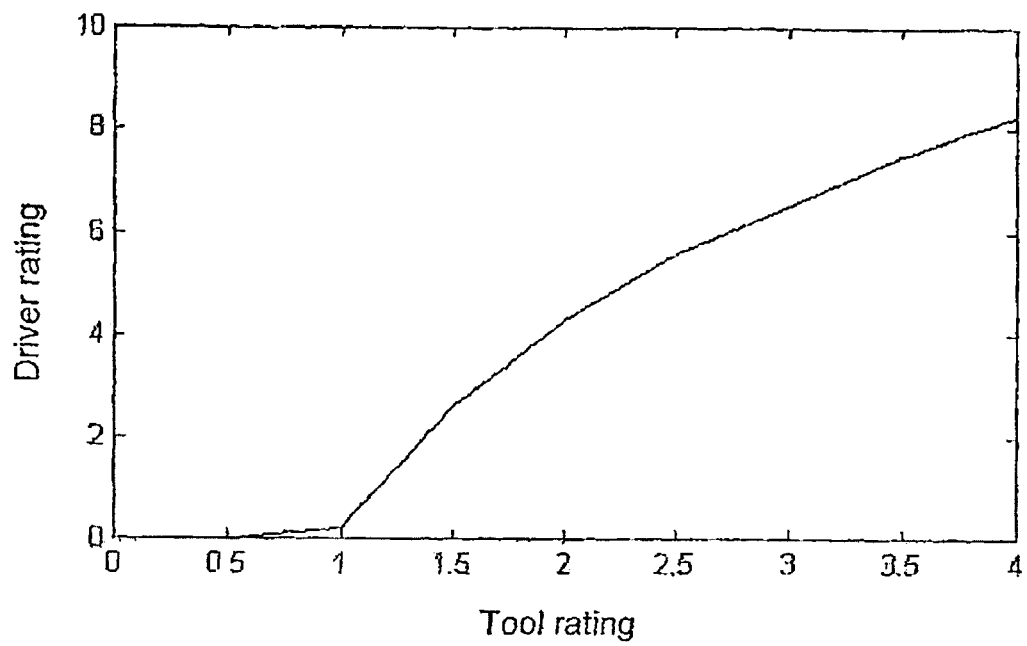
FIG. 12 is a plot of driver rating against tool rating according to the present invention.

FIG. 12 shows a transfer function according to which the rating out of 4 is converted to a rating out of 10. This transfer function is derived from correlating the automatically derived ratings and subjectively derived drivers ratings over a number of equivalent manoeuvres.

As a result it will be seen that the invention allows an accurate, repeatable and useful driveability analysis and development tool. Once the vehicle has been taken through the various manoeuvres, if aspects of its driveability are falling below the target values for a given manoeuvre, then the individual manoeuvre facets can be examined to establish which of those have contributed to the low rating. From this the developers can identify an appropriate development strategy for improving that factor by modifying the vehicle hardware or the engine management system. Once the transfer functions have been developed empirically and any calibratable values are identified for a given vehicle/engine then the vehicle can be test driven and the various ratings obtained can be compared against target ratings as part of the development process.

Tip-outs

It will be appreciated that the approach discussed above can be applied equally well to any type of driving manoeuvre for which driveability ratings might be required and this will be examined below. For example, in relation to tip-outs, these can be divided into manoeuvre facets comprising average acceleration decrease, maximum acceleration variation and total acceleration oscillation.

Figure 13:
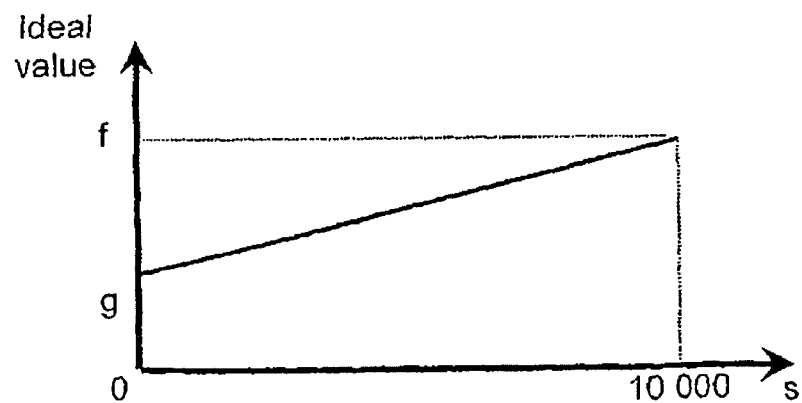
FIG. 13 shows a transfer function for an ideal acceleration decrease value against driver sportability s.

The calculation of the average acceleration decrease value corresponds exactly to calculation of the average acceleration increase value discussed above with reference to FIG. 3. Once the slope of the decreasing portion of the acceleration signal has been calculated as discussed above, however, the transfer function is as shown in FIG. 13. The acceleration decrease is strongly linked with safety feel.

However, the car's tendency to brake when the accelerator pedal is released is extremely variable from one make to another. This is one reason why calibratable parameters have been introduced in the functions used by the tool to evaluate the ratings according to the customer's wishes. Concerning the value the driver expects, it is quite clear that it depends on the gear engaged as well as on the driver's input. If the accelerator pedal is released very slowly or only partially, or if fifth gear is engaged, the driver expects a smoother back out than if the pedal is released quickly and completely or if first gear is engaged. Because the gear influences the ideal value, in order to have a single function for all the gears, all the variables are divided by the gear ratio, as defined in Equation (7).

As the expected value depends on the driver's input, the sportivity variable "s" (Equation (6)) is the input of the function defining the ideal accel decrease value, as set out in Equation (12), and represented in FIG. 13:

$$\text{ideal\_value} = (f - g) \times \frac{s}{10000} + g \quad (12)$$

where f and g are again calibratable parameters, representative values being f=3, g=1.4

Figure 14:
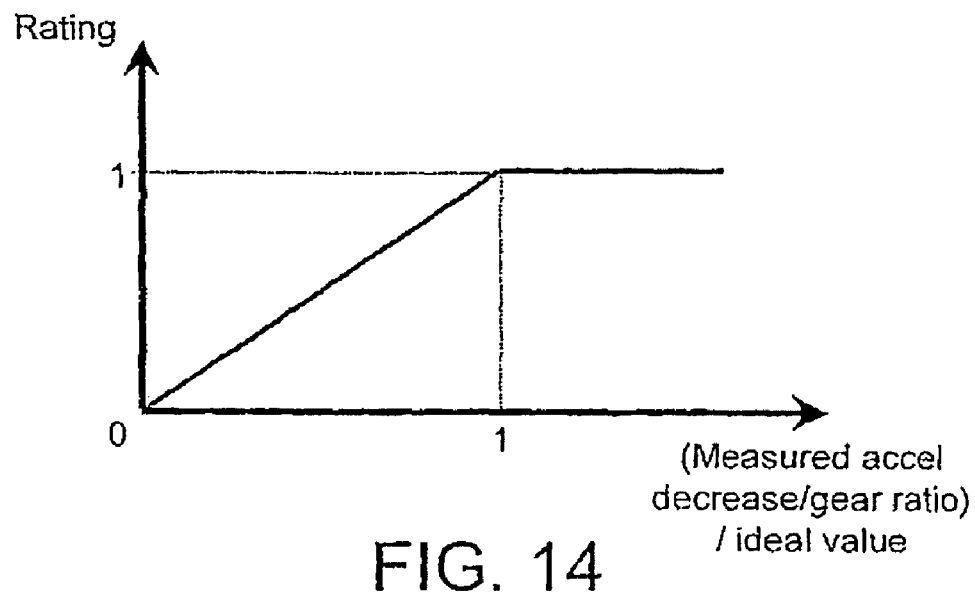
FIG. 14 is a transfer function for the acceleration decrease facets.

The rating of this characteristic of the accel signal is simply proportional to the ratio between the measured and the expected values, as shown in FIG. 14. So if the acceleration decrease is equal to or greater than the ideal value, the rating is 1. If it is lower, the rating is lower as well, as shown in Equation (13):

$$\text{Rating} = \min\left[\frac{\frac{\text{measured\_accel\_decrease}}{\text{gear\_ratio}}}{\text{ideal\_value}}, 1\right] \quad (13)$$

The next facet is acceleration maximum variation which contributes to the "back out" feel (i.e. the extent to which the car brakes on deceleration) as much as the average acceleration decrease value does. The analysis of the data reveals that drivers expect a relatively high instantaneous variation of acceleration for a satisfactory tip out, whatever the amplitude or quickness of the pedal movement. On the acceleration signal, this means the presence of an undershoot. This type of expectation is opposed to the ideal tip-in behaviour, where an acceleration overshoot, that is to say a thump, is usually unwanted.

Accordingly, a value delta_max is derived from the acceleration trace corresponding to the maximum drop in acceleration once the pedal is released.

Figure 15:
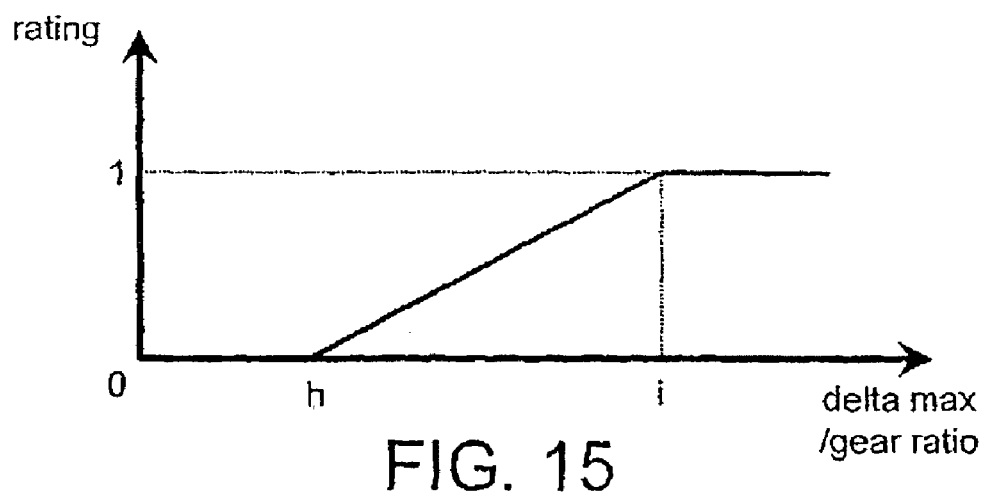
FIG. 15 shows a transfer function for the acceleration maximum variation facet.

The only input for the ideal value of acceleration maximum variation is the gear ratio. As it is a constant parameter, it is possible to derive directly the rating of this feature versus the measured delta_max divided by the gear ratio as shown in FIG. 15 and Equation (14):

$$\text{rating} = \frac{\max\left[\min\left(\frac{\text{delta\_max}}{\text{gear\_ratio}}, i\right), h\right] - h}{(i - h)} \quad (14)$$

Representative values for h and i are respectively 0.6 and 1.4.

The measurement of acceleration total oscillation during tip-out is equivalent for that in tip-in as discussed with reference to FIG. 6. In particular a total value of change in acceleration delta_accel is calculated in the same manner. However, there are two important differences in the way the rating is evaluated in the case of tip outs.

First, drivers are observed to be less indulgent with shuffles in high gears than in low gears. Gear ratio (Equation (7)) must be introduced in the calculation of the input variable of the rating function, in order to have a single function for all the gears.

Second, as a thump is expected at tip-outs, a "tolerance threshold" is used so that the ideal value for oscillations is not in contradiction with the ideal value for accel max variations.

Figure 16:
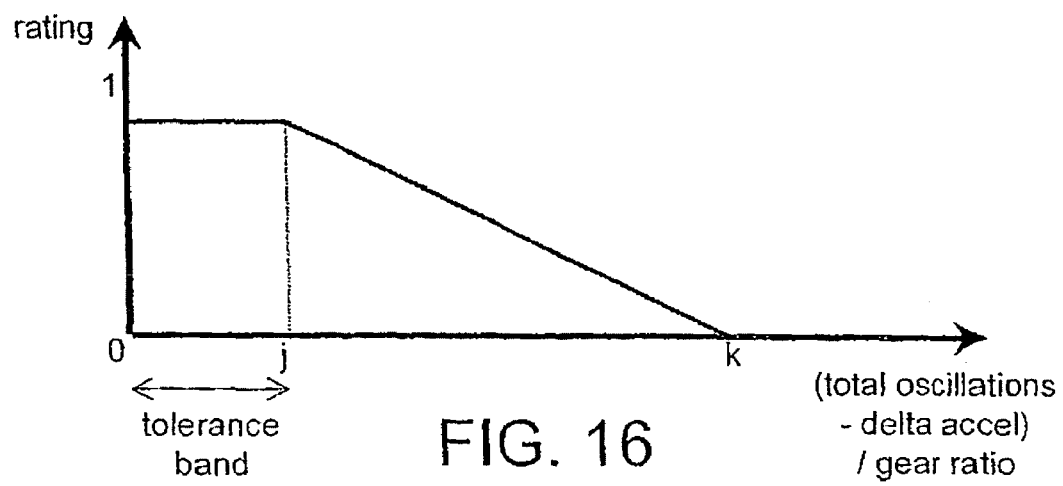
FIG. 16 shows a transfer function for the acceleration total oscillation facet.

FIG. 16 shows a representative trace and equation (15) shows the relationship in use.

$$\text{rating} = \max\left[1 - \frac{\max\left(\frac{\text{total\_oscillations} - \text{delta\_accel}}{\text{gear\_ratio}} - j, 0\right)}{(k - j)}, 0\right] \quad (15)$$

j and k are calibratable parameters.

Starts

One final example of the driveability rating approach of the present invention is given for a slightly different aspect, namely starts, which has two aspects rated entirely separately, cranking time value and start quality.

The clear requirement for cranking time is that the shorter it is the better, taking into account that the lower the engine codant temperature the longer the expected cranking time will be.

The definition of the cranking time is the time between the battery voltage drop and the moment when the engine speed rises above an initial value, this value being calibratable.

Figure 17:
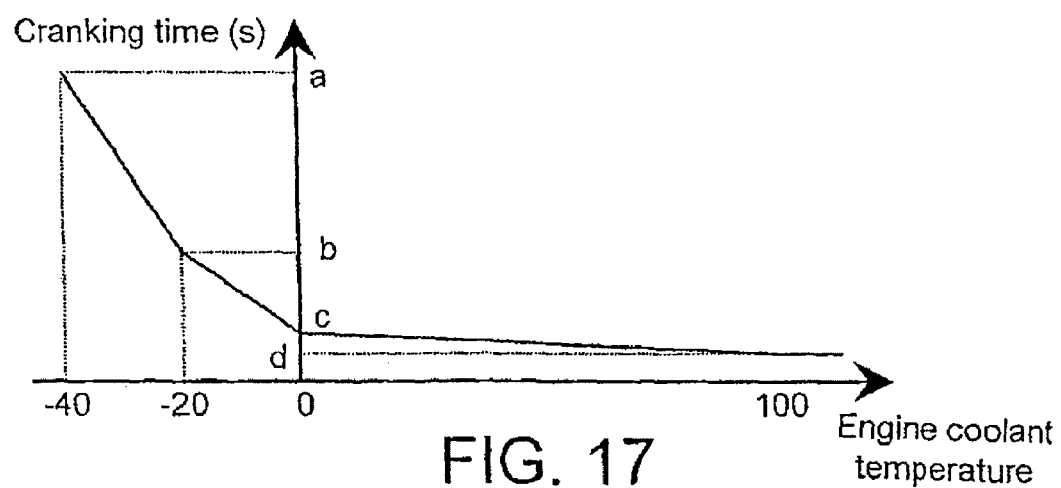
FIG. 17 shows a plot of cranking time against engine coolant temperature for a high cranking time rating $R_{ref}$.

A curve of good cranking time as a function of temperature is shown in FIG. 17 used on a reference high rating $R_{ref}$. a, b, c, d are calibratable parameters. A similar curve, developed for a lower rating may be developed.

Figure 18:
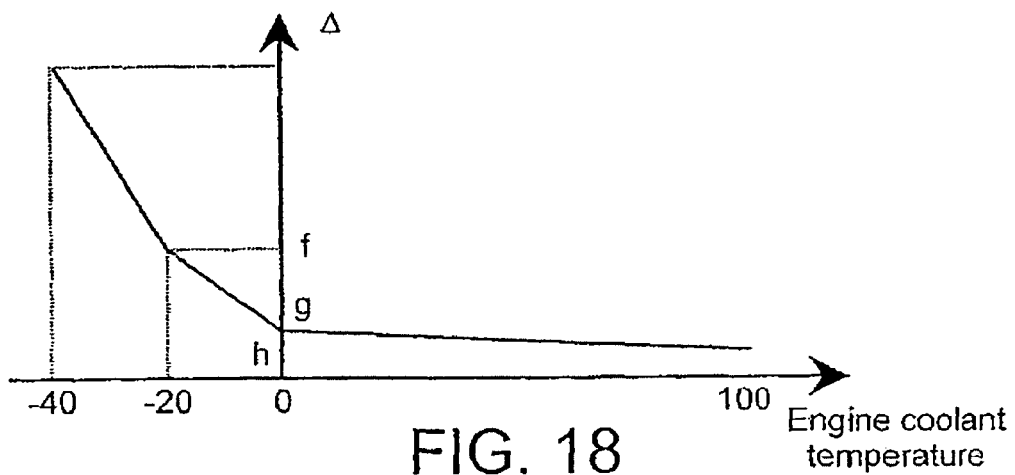
FIG. 18 shows the difference $\Delta$ between the high rating cranking time and a lower rating cranking time against engine coolant temperatures.

The curve shown in FIG. 18 presented below shows the difference (Δ) between a measured cranking time worth a low rating $R_{low}$ and the expected higher one $R_{ref}$. e, f, g and h are calibratable time values.

To obtain the rating for a start time at a given engine coolant temperature, the tool interpolates the cranking time for $R_{ref}$ at that temperature from FIG. 17 to obtain $CT_{high}$ for that temperature and then Δ for that temperature from FIG. 18 as a normalising factor.

The final rating for the measured cranking time—$CT_{measured}$—is calculated with Equation (16):

$$\text{Rating} = \min\left[\max\left(R_{ref} - \frac{(CT_{measured} - CT_{high}) \times 2}{\Delta}, 0\right), 10\right] \quad (16)$$

This formula gives a value between 0 and 10, directly comparable to the driver's rating.

Figure 19:
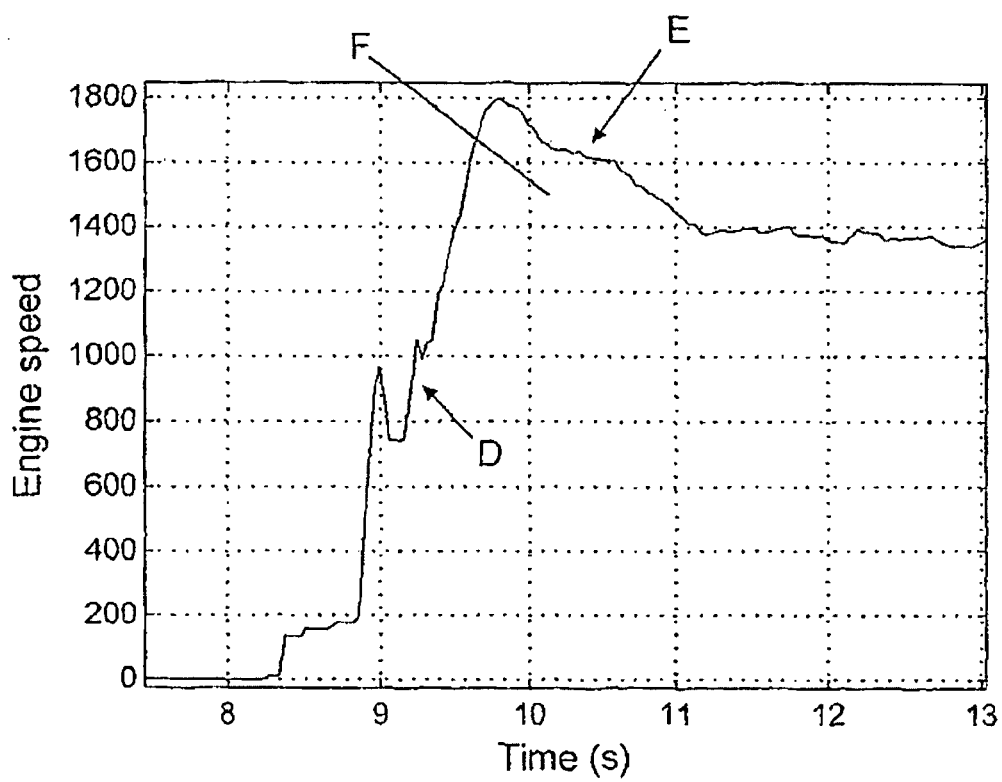
FIG. 19 is a plot of engine speed against time in engine start-up.

Start quality is evaluated according to a more complex range of features, some of which can be seen in the trace of engine RPM against time shown in FIG. 19 identified as: engine speed rise regularity (region D); engine speed decrease regularity (region E); flare value; flare area (region F). Empirically it is observed that this is a particularly subjective area in that different drivers clearly weight different aspects differently, but it is found that measurements of the four facets discussed above provides appropriate levels of objective rating derivation.

Engine speed rise regularity concerns the shape of the engine speed between the starter plateau and the "flare" as discussed below. The speed rise should normally be neat and sharp, without stumble or misfire, in order to give confidence that the engine will not stall just after cranking. Otherwise, the drivers' comments can be "poor run up after start", "stumble", "hesitation on run up", etc.

To calculate the local rating for this feature of engine start, the system filters the logged engine speed then differentiates it. The oscillations of the differentiated engine speed are afterwards evaluated, principally in the same way as with the seat rail acceleration facet for tip ins and tip outs (see for example FIG. 6): however only oscillations above a threshold are taken into account, and before they are added up, they are divided by the value of the differentiated engine speed at that point.

Figure 20:
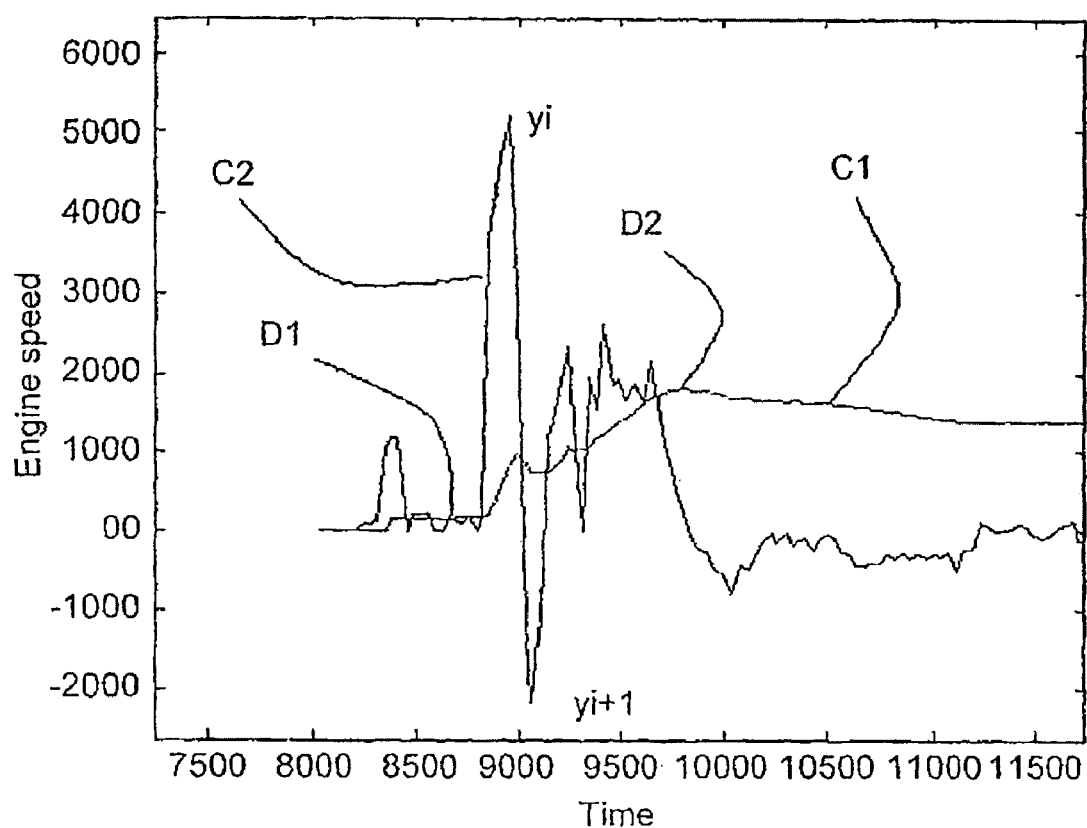
FIG. 20 shows plots on the same axes of engine speed versus time for engine speed and differentiated engine speed.

This division normalises the ratings which depend on engine temperature; when the engine is very cold, with temperatures far below 0° C., the observed slopes of engine speed are lower than in hot conditions, so the top values of the differentiated engine speed are also lower, as well as its oscillations, even if the run up is poor. As a consequence, the differentiated engine speed variations have to be made relative to the differentiated engine speed value before they are added up, otherwise the result of the calculation can be too similar between a bad cold start and a very sharp hot start Referring to FIG. 20, the curve $C_1$ is the engine speed and curve $C_2$ is the differentiated engine speed. The relative oscillations of $C_2$ are calculated between the end of the starter plateau and the flare. For instance, between the spikes $y_i$ and $y_{i+1}$, provided that abs($y_{i+1}-y_i$)>threshold (a calibratable value), the relative variation of the differentiated engine speed will be evaluated using Equation (17):

$$\text{Delta\_relative} = \text{abs}\left(\frac{y_{i+1} - y_i}{\max(y_{i+1}, y_i)}\right) \quad (17)$$

If Delta_relative is close to zero, it means that the oscillation is not too high ($y_i$ and $Y_{i+1}$ being measured from zero). If it is equal to one, it can mean, depending on the specific case, that for instance the derived engine speed dropped from its original value down to zero. As a consequence, the engine speed stops rising for a while, which is perceived by the driver as a hesitation. If Delta_relative is greater than one, it can mean that the differentiated engine speed dropped down to a negative value, in that case the engine speed not only stops rising but decreases for a while, which is typical of a stumble.

Figure 21:
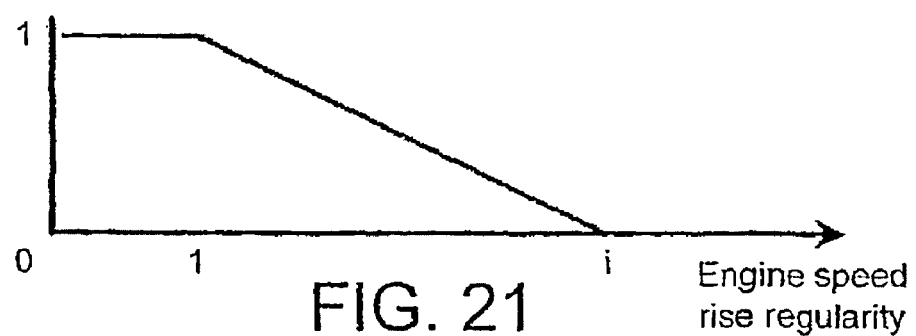
FIG. 21 shows a transfer function for the engine speed rise regularity facet.

Once each separate Delta_relative is calculated for all the variations of the derived engine speed between $D_1$ and $D_2$, they are added up. The higher the final value is, the worse the rating of engine speed rise regularity will be, as represented by FIG. 21, where i is a calibratable value, for example i=15.

Engine speed decrease regularity concerns the behaviour of engine speed between the flare and the point of return to idle. Ideally, the engine should return smoothly to the nominal idle speed, without undershoot. The return to idle should not be in two or more steps or worse, oscillatory. In case of wrong behaviour, the driver's comments may be "bounces on the way down", "2-stage return to idle", "return in steps", etc.

Figure 22:
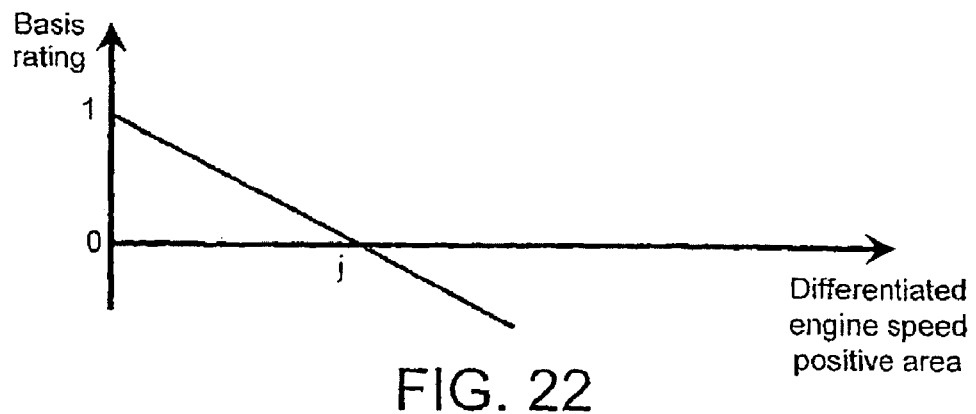
FIG. 22 shows a basis rating transfer function for engine speed decrease regularity.

To quantify the speed decrease irregularities, the system first calculates the sum of the positive variations of the engine speed, between the flare and the end of the return to idle (see FIG. 20). This value should be equal to zero since the engine speed is not supposed to rise again during the return to idle. Once this result is obtained, a first basis mark is given according to FIG. 22. It will be seen that this mark can be negative to have more impact on the final rating in case of really undesirable behaviour. j is a calibratable value, for example 100.

Figure 23:
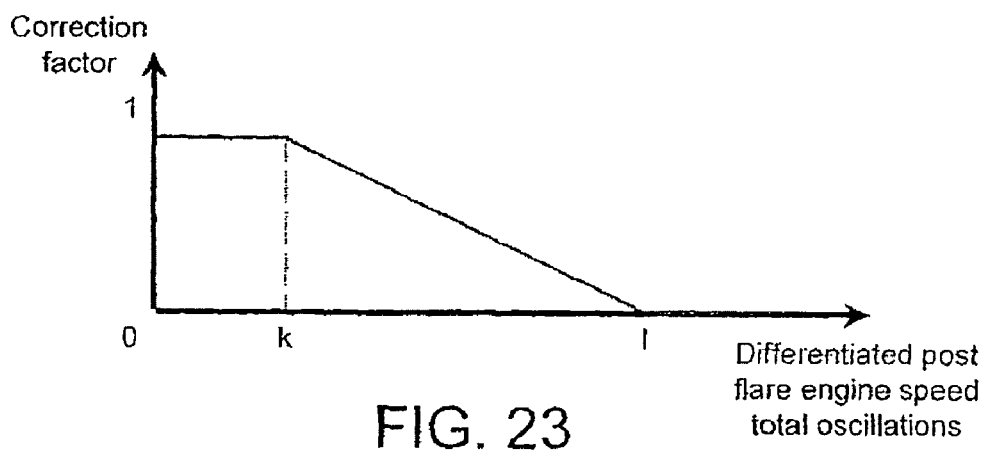
FIG. 23 shows a transfer function for a correction factor for the engine speed decrease regularity aspect.

Then the cumulative variations of the differentiated engine speed between the flare and the end of the return to idle are added up, in the same way as for the tip in oscillations as discussed with reference to FIG. 8, using a threshold equal to zero. The result is representative of the engine speed irregularity after the flare and is used to provide a correction factor for the basis rating previously calculated. This correction factor is evaluated as shown in FIG. 23. k and l are calibratable, for example k=300, l=3500.

The final rating of engine speed decrease regularity is obtained by multiplying the basis rating and the correction factor together. In the case of a negative basis rating, the multiplication is not applied, otherwise it would improve the final rating, the correction factor being included between 0 and 1. In that case the final rating is set to the basis rating, according to the following relation:

If Basis rating>0, Rating=Basis rating X Correction factor Else Rating=Basis rating (18)

It will be seen that this final rating can also be negative as the basis rating can be.

The flare value represents the difference between the maximum engine speed after the rise and the nominal idle speed (see FIG. 25). A reasonable amount of flare will give confidence to the driver that the engine is starting happily and easily. Little or no flare will give the impression that the start is weak, too much flare is noisy and sounds like an uncontrolled engine. The measurement of the flare value is straightforward from the analysis of the engine speed, as well as the rating of this start characteristic, referring to FIG. 24. m, n, o, p and q are calibrated and respective representative values are 0.75, −200, 200, 500 and 1000.

Flare area is very much linked to the flare value, and, in a lower proportion, to the engine speed decrease regularity. It characterises how long the engine speed hangs up before returning to idle. If this time is too long, it gives the feeling of an uncontrolled engine.

The variable calculated by the system is the area between the engine speed and an idle speed band around the nominal idle speed. This area is evaluated between the moment when the engine speed crosses the nominal idle speed and the end of the return to idle. It is calculated positively, whether the engine speed is higher or lower than the idle speed, as shown in FIG. 25.

This area is proportional to the duration of the return to idle as well as to the initial flare value, which is a good reflection of the driver sensitivity to this aspect of starts: even if the flare is correct but lasts for too long, the driver will lower his rating, the worst case being a "high hung up flare".

The rating of this start characteristic is represented in FIG. 26.

For each of tip-out and start ratings the values shown in tables 3 to 5 are used to obtain an overall rating, the start rating being divided between cranking time (table 4) and start quality (table 5).

TABLE 3

|  | average accel decrease (g/s) | total oscillations (g) | max delta accel (g) | TOTAL | TOOL'S RATING |
|---|---|---|---|---|---|
| Measurement | 0.74 | 1.46 | 0.6 |  |  |
| Ideal value | 1.36 | 0.82 | 0.72 |  |  |
| Mark (0 to 1) | 0.54 | 0.23 | 0.7 |  |  |
| Weight | 1 | 1 | 1 | 1.47 | 5.4/10 |
| Driver's comment: harsh |  |  | Sportivity: 7661 |  |  |

TABLE 4

|  | cranking time (s) | TOOL'S RATING |
|---|---|---|
| Measurement | 0.585 |  |
| Ideal value | 0.31 |  |
| Mark | 7.46 | 7.46/10 |

TABLE 5

| | rise regularity | decrease regularity (basis rating) | flare value | flare area | TOTAL | TOOL'S RATING |
|---|---|---|---|---|---|---|
| Measurement | 1.72 | 149 | 505 | 1585 | | |
| Ideal value | 1 | 0 | 200< x <500 | <150 | | |
| Mark | 0.95 | −0.49 | 0.99 | 0.57 | | |
| Weight | 1.5 | 1 | 0.75 | 0.75 | 2.1 | 5.4/10 |

In each case a transfer function as shown in FIG. 12 converts the rating to a rating out of 10.

It will be appreciated that any aspect of driveability can be rated in a similar way, broken down into appropriate facets and with empirically observed transfer functions. It will further be appreciated that additional or alternative vehicle performance measurements can be made and further derivations can be made based on those measurements. Calibration/development of engines based on the system can be carried out in any appropriate manner based on the high level, useful data and observations automatically available according to the system. The data obtained can be processed in any appropriate manner and additional processing or identification steps can be carried out on it to derive further information from the data obtained.

The invention claimed is:

1. A method of assigning a driveability rating to a predetermined maneuver in a vehicle comprising the:
   identifying a plurality of maneuver facets;
   recording vehicle performance data for the maneuver;
   deriving a local rating for each maneuver facet from the vehicle performance data; and
   combining the local ratings to provide an overall driveability rating for the maneuver, in which the local rating is derived using a predetermined transfer function.

2. A method as claimed in claim 1 in which the transfer function is derived empirically.

3. A method as claimed in claim 1 in which a vehicle driver driving style factor is derived from the recorded vehicle data and the local rating is derived taking the driver driving style factor in account.

4. A method as claimed in claim 1 in which the gear ratio for the maneuver is recorded, a related gear ratio factor identified and the local rating is derived taking the gear ratio factor in to account.

5. A method as claimed in claim 1 in which the local ratings are weighted prior to their combination to form an overall driveability rating.

6. A method as claimed in claim 1 in which the combined local ratings are subjected to an overall transfer function to provide the overall driveability rating for the maneuver.

7. A method as claimed in claim 1 in which the local rating is derived from a predefined valid portion of the vehicle performance data.

8. A method as claimed in claim 7 in which the predefined valid portion of the vehicle performance data is processed to provide representative data prior to derivation of the local rating.

9. A method as claimed in claim 8 in which the processing step includes a linearization step.

10. A vehicle development method comprising: assigning a driveability rating for a maneuver as set out in claim 1, comparing the assigned rating with a target value and, if the target value is not met, identifying the respective local ratings for each facet of the maneuver, identifying those local ratings not meeting respective target sub-values and identifying related vehicle performance factors requiring development.

11. A driveability rating system for a vehicle comprising, for a predetermined maneuver having a plurality of maneuver facets, vehicle performance data for the maneuver recorded in a data store or processor, a local rating is derived by a data processor for each facet from the vehicle performance data; wherein the local ratings are combined in the processor to provide an overall driveability rating for the maneuver in which the local ratings are derived using respective predetermined transfer functions.

12. A method of assigning a driveability rating to a predetermined maneuver in a vehicle comprising:
   deriving a rating function for a predetermined rating value;
   identifying an error or proportional value between the derived function and a measured function; and
   deriving a rating based on the error or proportional value.

* * * * *